April 12, 1927.　　　E. A. KIENAST　　　1,624,744
AUTOMATIC HYDRAULIC IRRIGATION SYSTEM
Filed Oct. 24, 1924　　3 Sheets-Sheet 2

INVENTOR
ERNST A. KIENAST
BY Richards & Geier
ATTORNEYS

April 12, 1927. 1,624,744
E. A. KIENAST
AUTOMATIC HYDRAULIC IRRIGATION SYSTEM
Filed Oct. 24, 1924   3 Sheets-Sheet 3

INVENTOR
ERNST A. KIENAST
BY Richards & Geier
ATTORNEYS

Patented Apr. 12, 1927.

1,624,744

UNITED STATES PATENT OFFICE.

ERNST A. KIENAST, OF LOS ANGELES, CALIFORNIA.

AUTOMATIC HYDRAULIC IRRIGATION SYSTEM.

Application filed October 24, 1924. Serial No. 745,700.

This invention relates to improvements in irrigation systems, and has particular reference to a mechanism for controlling the distribution of water to the various sections or areas to be irrigated.

An object of the invention is to provide a mechanism capable of automatically regulating the distribution of water to a plurality of sections or areas in succession.

Another object is to regulate the time interval during which each section is to be irrigated and to automatically control repetitions of the irrigating operation.

A further object is to employ a plurality of tanks for controlling the distribution to the various sections and to utilize drainage from said tanks in automatically shutting off the flow to said sections at the termination of one or more operations of irrigating the same.

The above and other objects will appear more clearly from the following detailed description, when taken in connection with the accompanying drawings, which illustrate a preferred embodiment of the inventive idea.

In the drawings—

Figure 1:
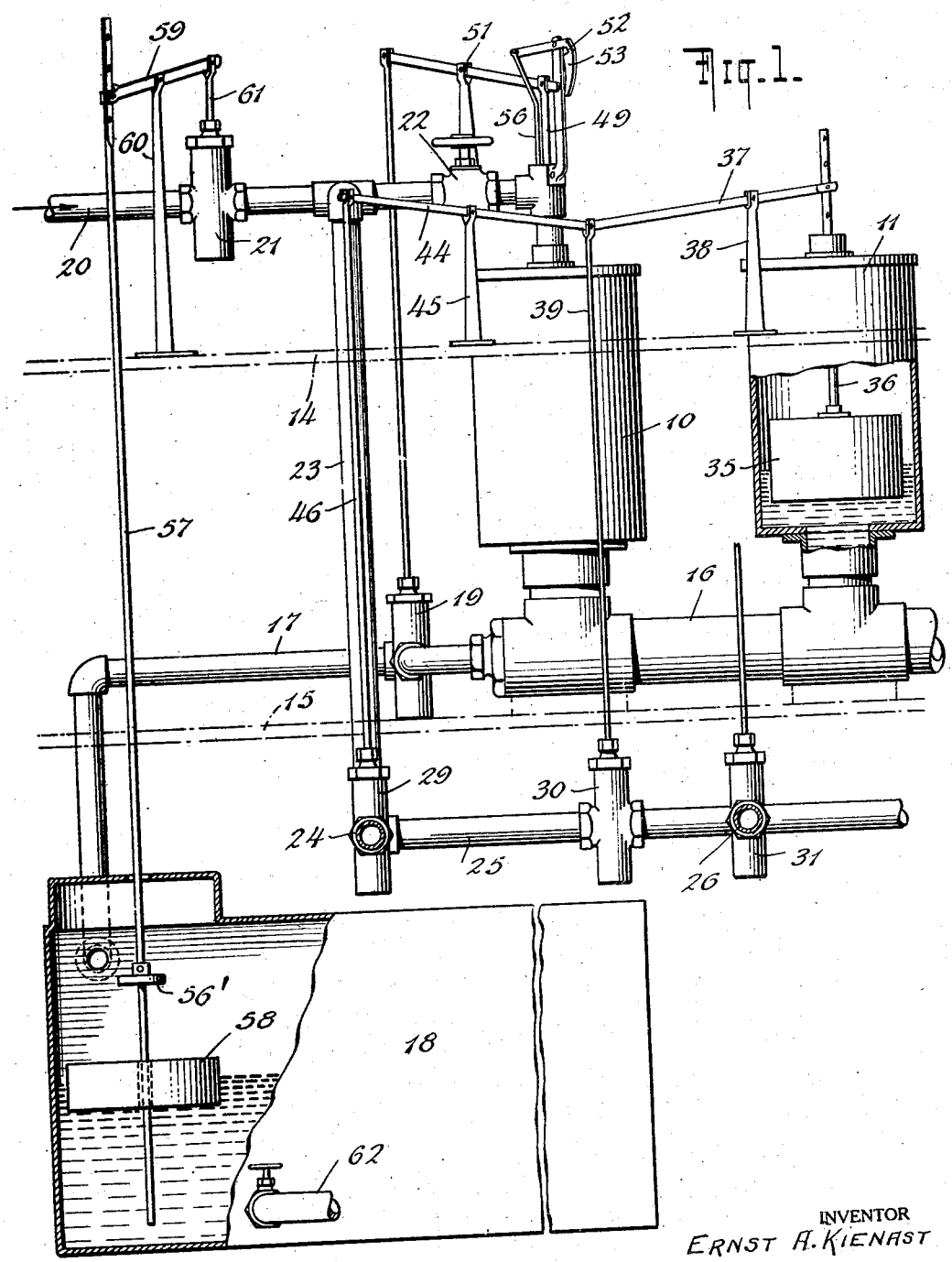
Figure 1 is a fragmentary side elevation of the system constructed in accordance with the invention, certain parts being in operated position and other parts being broken away and shown in section.
Figure 2:
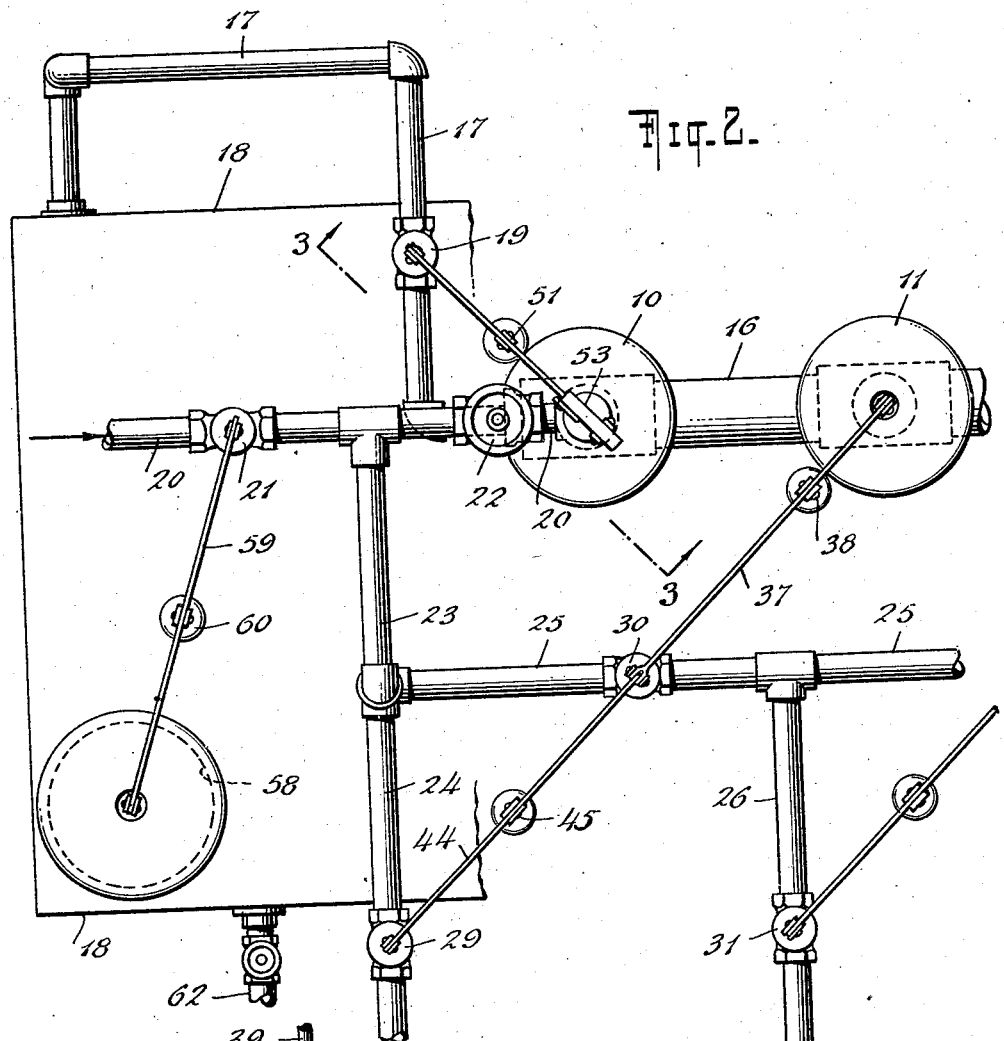
Figure 2 is a fragmentary top plan view of the system.
Figure 6:
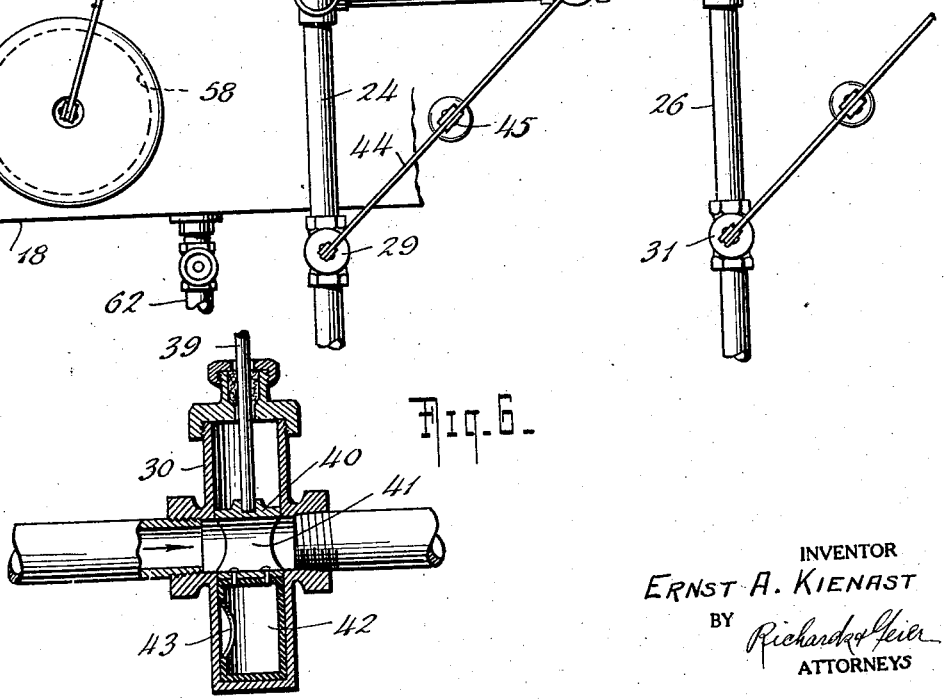
Figure 6 is a vertical longitudinal section through one of the valves employed in connection with the invention.

The apparatus of the invention is shown in its preferred form as consisting of a plurality of tanks 10, 11, 12 and 13, the number of these tanks being optional and depending upon the number of sections or areas to be irrigated. The tank 10 is a primary tank, and the secondary tanks 11, 12 and 13, are each individual to one of the sections or areas to which water is to be distributed. The tanks 10 to 13 are mounted in any suitable manner between the upper and lower supports 14 and 15, indicated in dotted lines in Figure 1, and the lower ends of these tanks are connected to a common drain pipe 16 having an extension 17 leading to a drainage tank 18, the purpose of which will later appear. Interposed between the drain pipe 16 and the extension 17 is a valve 19 which is normally closed to prevent water from the tanks 10 to 13 from flowing into the extension 17. This valve is of the same construction as other valves employed in connection with the invention and is shown in detail in Figure 6.

Figure 5:
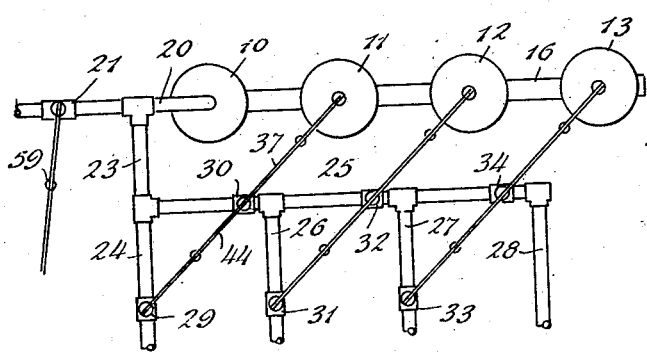
Figure 5 is a diagrammatic plan view.

Water is supplied to the various tanks 11, 12 and 13 through the main tank 10 by means of a supply pipe 20 connected to any suitable source of supply and having interposed therein a valve 21 which is normally open to permit the water to flow through the pipe 20, the control valve 22 and from thence into said tank 10. The pipe 20 may be provided at any desired point with another valve (not shown) which can be utilized to entirely shut off the flow of water to the system. A branch 23 of the supply pipe 20 is in direct communication with the feed pipe 24 leading to one of the sections or areas to be irrigated and is further connected, through the common pipe 25, to the other feed pipes 26, 27 and 28 leading to other sections or areas to be irrigated (see Figure 5). Individual to the feed pipe 24 and controlled by the rise of water in the tank 11, as will later be described, are the valves 29 and 30, the former of which is mounted in the pipe 24 and normally open, while the latter is mounted in the common pipe 25 between the pipes 24 and 26 and normally closed. Likewise the feed pipes 26 and 27 have the valves 31, 32 and 33, 34, respectively, associated therewith and arranged in the same manner as the valves 29 and 30. Thus at the start of the operation of the system the water flowing into the branch 23 will pass into the feed pipe 24 and be prevented from entering the feed pipe 26 until such time as the valve 30 is opened. The time interval during which the water is supplied to the feed pipe 24 to irrigate the section or area individual to said feed pipe is controlled by the rise of the water level in the tank 11 individual to said feed pipe. The speed at which said level rises in said tank is in turn controlled by means of the valve 22 which may be operated to regulate the amount of water from the supply pipe 20 entering the tank 10 and consequently the remaining tanks. Thus if it is desired to irrigate the various sections a comparatively long time the flow of water into the tanks is correspondingly reduced and, on the other hand, if the irrigation is to continue for only a short period the flow of water into said tanks is increased.

In order to control the valves 29 and 30 so that the flow of water through the feed pipe 24 is shut off and said flow permitted to enter the next succeeding feed pipe 26 at the termination of a definite period of time, the tank 11 has disposed therein a float 35 to which is connected a rod 36 extending upwardly through the top of the tank, the projecting end of said rod having adjustably connected thereto one end of a rocker arm 37 pivoted intermediate its ends to a standard 38 carried upon the support 14. The other end of said lever is pivotally connected to the upper end of a valve stem 39, the lower end of which is joined to the plunger or piston 40 of the normally closed valve 30.

Briefly, this plunger or piston 40 is capable of reciprocation in the valve casing and has a transverse port 41 extending therethrough adapted to register with the pipes connected to opposite sides of the valve casing. The plunger further carries a flexible member 42 fitted within the valve casing and having an inlet port 43 on one side thereof capable of registration with the inlet pipe connected to the casing. The opposite wall of the member 42 is capable of closing the outlet of the casing and it will be apparent that when the port 43 is in registration with the inlet of the casing the pressure of water against the wall of the member 42 opposite said port will force said wall of the flexible member into tight fitting engagement with the portion of the casing surrounding the outlet thereof and thus effectively prevent the passage of water through said casing.

A second rocker arm 44, similar to the arm 37, is pivoted intermediate its ends to the standard 45 and has one end connected to the valve rod 39 and its other end to the upper end of the valve rod 46, the lower end of which is joined to the plunger of the valve 29. Thus when the float 35 is forced upwardly a slight distance by the rise of the level of the water in the tank 11, the rocker arms 37 and 44 will be moved to the operated position shown in Figure 1, and this movement will effect the closure of the valve 29 and the opening of the valve 30. The flow of water through the feed pipe 24 is therefore stopped and the supply in the branch 23 is thereby diverted through the valve 30 and into the feed pipe 26 to irrigate the next succeeding section. When the float, similar to the float 35, in the tank 12 individual to the feed pipe 26 has been elevated by the rise of the water in said tank the valve 31 will be closed and the valve 32 opened in the same manner as described in connection with the valves 29 and 30. The operation thus continues through the series of floats until all of the areas controlled by the various feed pipes have been irrigated.

Figure 4:
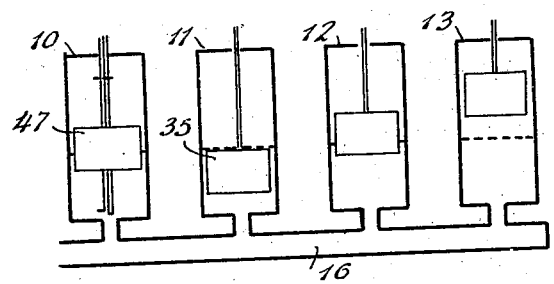
Figure 4 is a fragmentary diagrammatic view of a portion of the mechanism comprising the system.

In order that successive irrigation of the various sections or areas may be accomplished, the floats in the various tanks 11, 12 and 13 are arranged at different levels, as clearly shown in Figure 4, each succeeding float being normally disposed at a higher level so that any one float will not be raised to actuate its associated valves until after a predetermined interval following the operation of the preceding float. The relative positions of the floats may be regulated and the time interval for the irrigation of the sections correspondingly varied by adjustably connecting the rod of each float to its associated rocker arm 37.

Figure 3:
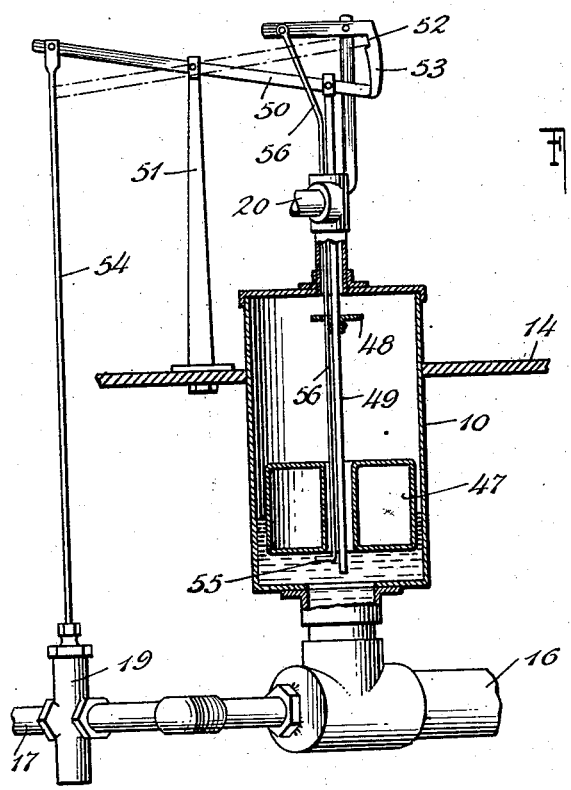
Figure 3 is a section taken substantially on the line 3—3 of Figure 2.

During the interval in which the various sections are being irrigated through the pipes 24, 26, 27 and 28 the level of the water in the tank 10 rises and thereby elevates the float 47 in said tank. This float continues to rise until the same engages a stop 48 adjustably secured to a rod 49 projecting from the upper end of said tank and the engagement of said float with said stop is timed to occur at the termination of the irrigation of the section or area supplied by the pipe 28. A slight upward movement of the rod 49 then takes place under the influence of the float 47 and thereby causes the rocker arm 50 to be rocked about its pivot on the standard 51 to the dotted line position shown in Figure 3. In this position one end of the rocker arm 50 engages in a notch 52 formed in the pivoted latch 53 and the movement of said rocker arm to its operated position is utilized to actuate the valve rod 54 and thereby open the valve 19 in the drain pipe 16. The opening of this valve permits the water in the various tanks 10 to 13 to drain therefrom through the pipe 17 and into the drainage tank 18. This tank 18 may be sufficiently large to permit of several drainage operations of the tanks 10 to 13 before the mechanism associated with said tank is actuated to stop the operation of the system.

As the water is drained from the tanks 11 to 13 the floats therein will return to their normal position and by reason of the weight of said floats and the connected parts the return to normal thereof will accomplish a reversal of the operation of the various valves 29 to 34 inclusive thereby restoring said valves to normal. The draining of the tank 10 allows the float 47 to be lowered in said tank until the same engages a lateral extension 55 of a rod 56, the upper end of which projects through the tank and is connected to one end of the latch 53. The weight of the float 47 against the extension 55 forces the rod 56 downwardly and thereby swings the latch 53 to release the engaged end of the rocker arm 50, whereupon the weight of the parts will cause a restoration of the valve 19 to its closed position shutting off any further drainage of the tanks 10 to 13. As soon as the valve 19 is closed water from the supply pipe 20 will again flow into the tank 10 at which time the level of said water in the various tanks again begins to rise to actuate the floats in the various tanks in the same manner as previously described, the floats in the tanks 11 to 13 being successively operated.

Thus the operation of the system is repeated and the number of such repititions may be regulated in accordance with the adjustment of a stop 56' secured upon the rod 57, the lower end of which projects into the drainage tank 18 and has movable thereon the float 58. The upper end of the rod 57 is adjustably connected to a rocker arm 59 pivotally mounted intermediate its ends upon a standard 60, one end of the rocker arm being connected to the valve rod 61, which is in turn connected to the plunger of the valve 21. From this construction it will be apparent that when the float 58 engages the stop 56', which engagement is preferably timed to occur at the termination of one of the irrigation operations by an adjustment of the stop 56', the rod 57 will be elevated thus operating the valve 21 to a closed position, the member 42 of this valve being, in this instance, arranged in the upper portion of the valve casing as distinguished from the showing in Figure 6. The closure of the valve 21 shuts off any further flow of water from the supply pipe 20 into the various tanks 10 to 13 and thereby stops the operation of the system as long as the water in the drainage tank 18 remains therein. It will be obvious that the operation of the system can again be automatically started by emptying the tank 18 which may be accomplished by means of a valved drain pipe 62. As the water flows from the tank 18 the float 58 will disengage the stop 56' and the rod 57 will then restore to its normal position under its own weight and again open the valve 21.

What is claimed is:

1. In an irrigation system, a plurality of feed pipes leading to individual sections to be irrigated, a primary tank, and a plurality of secondary tanks each individual to and connected with one of the said feed pipes, a drain pipe connected with said primary and secondary tanks, a drain tank, and means connected with said primary tank for controlling the discharge of the contents of said drain pipe into said drain tank.

2. In an irrigation system, a plurality of feed pipes leading to various sections to be irrigated, a supply pipe connected to said feed pipes, a plurality of tanks to which water is fed from said supply pipe, certain of said tanks being each individual to one of said feed pipes, floats in said tanks each supported in its tank at a different level from the floats in the other tanks, means operated by the movements of said floats in their respective tanks when the water rises therein for causing water from said supply pipe to successively enter the various feed pipes, and means also controlled by the movements of said floats for closing communication between said supply pipe and the feed pipe preceding the one into which the water is entering from said supply pipe.

3. In an irrigation system, a plurality of feed pipes, a supply pipe therefor, a plurality of tanks each individual to one of said feed pipes, another tank common to said plurality of tanks, means operated by the rise of water in said plurality of tanks for controlling the flow of water from said supply pipe to said feed pipes, and means operated at a predetermined time and controlled by the rise of water in said common tank for draining the water from said tanks.

4. In an irrigation system, a plurality of feed pipes leading to individual sections to be irrigated, a primary tank, a plurality of secondary tanks connected to said primary tank and each individual to one of said feed pipes, a supply pipe connected to said primary and secondary tanks and to said feed pipes, means controlled by the rise of water in said secondary tanks for successively connecting each of said feed pipes with said supply pipe, and means operated by the rise of water in said primary tank for draining all of said tanks following the successive connection of said feed pipes with said supply pipe.

5. In an irrigation system, a plurality of feed pipes leading to individual sections to be irrigated, a primary tank, a plurality of secondary tanks connected to said primary tank and each individual to one of said feed pipes, a supply pipe connected to said primary and secondary tanks and to said feed pipes, means controlled by the rise of water in said secondary tanks for successively connecting each of said feed pipes with said supply pipe and for closing communication between said supply pipe and the feed pipe preceding the one into which the water is entering from said supply pipe, and means operated by the rise of water in said primary tank for draining all of said tanks following the successive connection of said feed pipes with said supply pipe.

6. In an irrigation system, a plurality of feed pipes, a source of supply therefor, a plurality of tanks each individual to one of said feed pipes, another tank common to the first named tanks, means operated by the rise of water in said plurality of tanks for controlling the flow of water from said source to said feed pipes, and means also controlled by the rise of water in said common tank for draining the water from all of the tanks.

In testimony whereof I have affixed my signature.

ERNST A. KIENAST.